C. F. RUBIN.
INCANDESCENT LIGHT GUARD.
APPLICATION FILED APR. 27, 1914.

1,129,125.

Patented Feb. 23, 1915.

UNITED STATES PATENT OFFICE.

CHARLES FRANK RUBIN, OF MILWAUKEE, WISCONSIN, ASSIGNOR OF ONE-HALF TO JOHN TEDBER HOBSON, OF MILWAUKEE, WISCONSIN.

INCANDESCENT-LIGHT GUARD.

1,129,125.      Specification of Letters Patent.      Patented Feb. 23, 1915.

Application filed April 27, 1914. Serial No. 834,679.

*To all whom it may concern:*

Be it known that I, CHARLES FRANK RUBIN, a citizen of the United States, and resident of Milwaukee, in the county of Milwaukee and State of Wisconsin, have invented certain new and useful Improvements in Incandescent-Light Guards; and I do hereby declare that the following is a full, clear, and exact description thereof.

My invention consists in what is herein particularly set forth with reference to the accompanying drawings and pointed out in the claims of this specification, its object being to provide simple, economical and efficient guards for the protection of incandescent electric-lights, upon which they are self adherent.

Figure 1:
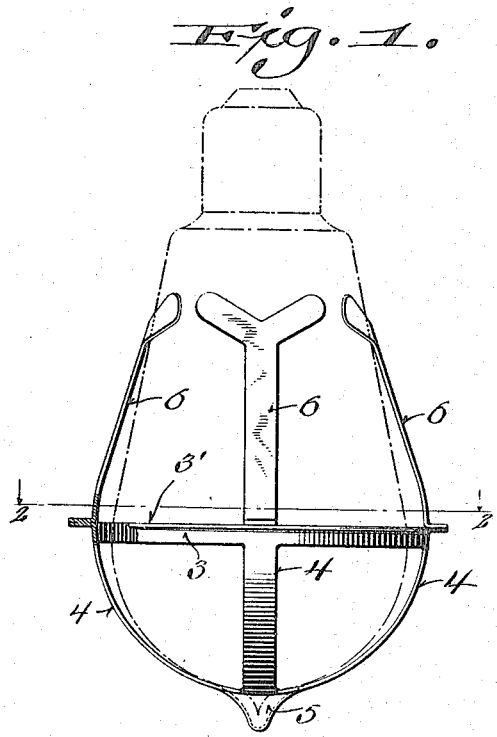
Figure 2:
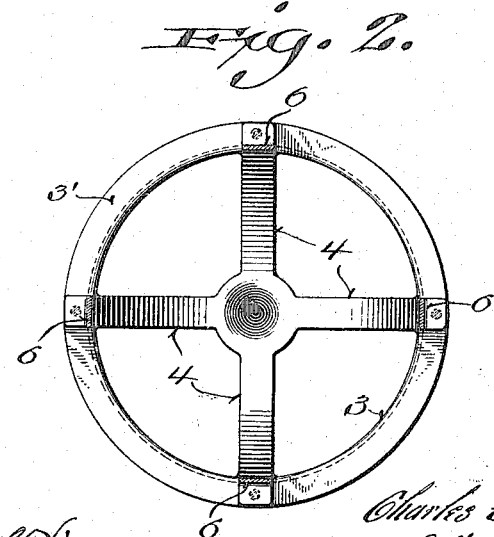

Figure 1 of the drawings represents an elevation partly in section of a guard in accordance with my invention applied to an incandescent electric-light bulb that is shown by dotted lines, and Fig. 2, a plan view of the guard partly in horizontal section on the plane indicated by line 2—2 in Fig. 1.

Referring by numerals to the drawings, 3 indicates a ring, 3' an outer flange of the ring, 4 each of a series of curvilinear bars and 5 a socket, the bars being at regular intervals apart and connecting said ring and socket to therewith form a cage of approximate hemispherical form. Spot-welded or otherwise rigidly secured to the flange 3' of the cage-ring 3, in register with the bars of said cage or otherwise, are outwardly bent ends of a series of flat spring-arms 6, the free ends of these arms being inwardly converging and preferably forked as herein shown. If forked, the free end of each spring-arm is bent upon an arc of a circle.

The cage is preferably fashioned from a single circular blank of sheet-metal, but its construction, and the application of the spring-arms thereto, may be indefinitely varied without departure from my invention, as herein claimed.

The cage with the spring-arms extending therefrom constitute a guard in accordance with my invention, and this guard being slipped on an incandescent electric-light bulb, the nib of the bulb comes within the socket-end of said cage, while at the same time there is a spread of the free ends of said arms to effect a grip of the same on said bulb. Hence the guard as a whole is self adherent on the bulb.

In practice, the guards will be made in various sizes corresponding to standard sizes of incandescent electric-light bulbs.

I claim:

1. An incandescent light guard comprising a cage consisting of a ring having an outwardly extending flange, a socket with which to engage the nib of the light-bulb, and curvilinear bars at regular intervals apart connecting the ring and socket; together with a series of inwardly converging spring-arms each having an end thereof in rigid connection with the ring-flange of the cage.

2. An incandescent light guard comprising a cage consisting of a ring, a socket with which to engage the nib of the light-bulb, and curvilinear bars connecting the ring and socket; together with spring bulb-gripping devices in rigid connection with said ring of the cage.

In testimony that I claim the foregoing I have hereunto set my hand at Milwaukee in the county of Milwaukee and State of Wisconsin in the presence of two witnesses.

CHARLES FRANK RUBIN.

Witnesses:
HENRIETTA C. HOBSON,
J. TEDBER HOBSON.

Copies of this patent may be obtained for five cents each, by addressing the "Commissioner of Patents, Washington, D. C."